Dec. 26, 1967  R. M. DONAHO, JR  3,360,301
LOADING APPARATUS FOR BULK TRANSPORT SYSTEMS
Original Filed July 29, 1963  2 Sheets-Sheet 1

RUEL M. DONAHO, JR.
INVENTOR.

BY *Roy H. Smith, Jr.*
ATTORNEY

RUEL M. DONAHO, JR.
INVENTOR.

BY *Roy H. Smith, Jr*
ATTORNEY

United States Patent Office 3,360,301
Patented Dec. 26, 1967

3,360,301
LOADING APPARATUS FOR BULK TRANSPORT SYSTEMS
Ruel M. Donaho, Jr., Houston, Tex., assignor to Hughes Tool Company, Houston, Tex., a corporation of Delaware
Continuation of application Ser. No. 298,185, July 29, 1963. This application July 11, 1966, Ser. No. 564,426
2 Claims. (Cl. 302—53)

ABSTRACT OF THE DISCLOSURE

A hopper filled with such particulate matter as coal is connected to a feed line through an outlet conduit, and is supplied with an inexpensive transport fluid such as water through an inlet conduit. The water picks up the coal and carries it off as a slurry in the outlet conduit and feed line. The particular relative dispositions of the ends or terminals of the two conduits within the hopper overcomes the bridging problem, a phenomenon in which the particulate material jams up and interlocks to form a compact plug or bridge over the outlet terminal, preventing further movement of the particular matter.

The inventor has found that such bridging occurs when the inlet and outlet terminals are widely separated from each other, and is avoided only when they are brought closely together with the conduits arranged for internal flows at an angle significantly greater than 90 degrees and preferably close to 180 degrees. Although various relative dispositions and numbers of the conduits are workable, the preferred one is a coaxial arrangement wherein a single inlet conduit surrounds a single outlet conduit and their terminals are substantially coplanar.

---

This application is a continuation of application No. 298,185 filed July 29, 1963, now abandoned.

This invention relates to bulk transport systems and more particularly concerns an apparatus for loading solid particles in a fluid medium.

Systems for transporting solids have been extensively investigated in recent years. Interest has focused on hydraulic methods whereby solid particles such as coal, gravel, sand, ores, etc., are dispersed in a fluid medium and pumped through pipelines. Compared with mechanical systems, the hydraulic or bulk transport system has advantages so well known that enumeration is unnecessary. There are, however, certain disadvantages to this system, and especially noteworthy is the tendency of the solids to plug or bridge in the mixing apparatus, usually near the terminal of the outlet conduit. This bridging problem will be better understood with reference to the apparatus and mode of operation of a system commonly used.

Such apparatus generally consists of a lock hopper having a bell valve at its upper end for introducing solids, a conduit to introduce fluid into the hopper, and another conduit to carry off the mixture of fluid and solids. In operation the solids are dumped into the hopper and thereafter the bell valve is closed. Fluid is pumped through the inlet conduit into the sealed hopper, washing the solids from the hopper into the outlet conduit. Bridging of the particles frequently ocurs either at a point between the inlet and outlet terminals or in the outlet conduit due to the cohensiveness of wet particles, the accumulation of particles in the outlet vicinity, and the resulting pressure differential in that area. Accordingly, it is the object of this invention to overcome this bridging problem and other disadvantages prevalent in the prior art.

Another object is to provide a loading device having no moving parts and thus requiring little maintenance. Another object is to provide an apparatus which is operable even though the container geometry varies radically. Still another object is to disperse the solid particles more evenly in the fluid outlet stream and thus eliminate pressure surges caused by accumulations of particles. Yet another object is the provision of a loading device which is operable with almost any solid-fluid combination with little or no need for modifications.

In accordance with the foregoing objects, the present invention broadly embraces relative dispositions of inlet and outlet conduits attached to a hopper such that fluid delivered into the hopper from the inlet port (terminal of the inlet conduit) is directed to break up any bridges of solid particles that may tend to form over the outlet port and choke the outflow of slurry therethrough. More specifically, the inlet conduit is disposed at an angle less than a straight angle with respect to the outlet conduit, preferably at approximately a zero angle, the angle being measured between the terminal segments of the conduits, so that in the most preferred orientation the flows will be parallel and opposed, and with the inlet port adjacent the outlet port.

Other objects and advantages of this invention will become apparent hereinafter and in the drawing in which.

In describing the preferred embodiment of the invention, specific terminology will be used for the sake of clarity. The invention is not limited to these specific terms, however, but includes all equivalents which operate in a similar manner to accomplish a similar result.

Figure 1:
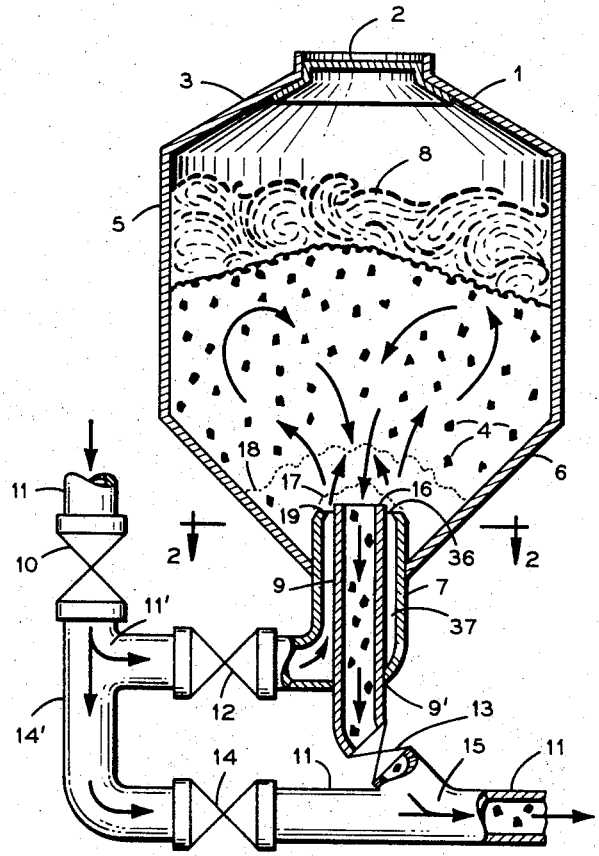
FIGURE 1 is an elevational view of a loading apparatus partially in section showing the inlet and outlet conduits arranged in accordance with the present invention and one arrangement of valves.

Turning now to the specific embodiment illustrated in FIGURE 1, the numeral 1 designates a sealable chamber or hopper having a bell valve 2 which sealingly engages the upper conical portion 3 of the hopper, but which opens when desired so that solid particles 4 may be introduced. The hopper may have any desired geometry but as illustrated here is substantially cylindrical as shown by 5, having a lower conical portion 6 into which is inserted inlet conduit 7 through which the fluid 8 is introduced. The outlet conduit 9 of this embodiment is coaxially aligned with inlet conduit 7, the two conduits having terminals designated respectively by numerals 16 and 19. As shown by numeral 9′, conduit 9 intersects and projects through conduit 7 in a manner to prevent leakage at this juncture.

The quantity and direction of fluid flow can be controlled by numerous valve arrangements, the one shown in FIGURE 1 being merely illustrative. As shown, master valve 10 is inserted in the primary flow line 11 to control the overall flow through the system. To control the flow into hopper 1, inlet valve 12 is inserted in inlet conduit 7 which is in turn connected to primary flow line 11 at 11′. Similarly, outlet valve 13 is inserted in outlet conduit 9 which is connected to primary flow line 11 at 15, thus controlling the flow out of hopper 1. Finally, bypass valve 14 is located in bypass conduit 14′.

In operation valve 10 is initially closed, as are valves 12 and 14, while solids 4 are introduced into hopper 1 through bell valve 2. To prevent solids from initially filling and possibly jamming outlet conduit 9, outlet valve 13 is also closed. Hopper 1 is then filled to any desired level with solids 4, but it is preferable to leave some unfilled space at the top to permit some movement of solids upon the subsequent entry of fluid 8. After entry by the solids is completed, bell valve 2 is sealingly closed. Master valve 10 is opened as is bypass valve 14 so that fluid flows past the point of communication 15 between outlet conduit 9 and by-pass conduit 14′. This sequence of the operations is beneficial in drawing the solids 4 from outlet conduit 9 upon the subsequent opening of valve 13, thereby preventing the jamming of conduit 9 due to the rapid entry of solids. Then outlet valve 13 and inlet valve 12 are opened and consequently, the fluid 8 begins to fill hopper 1. The pressure provided by a pumping means (not shown) connected to primary flow line 11 is exerted on the inside of the hopper and hence flow is directed toward and through outlet conduit 9. The flowing portions of fluid 8 entrain solid particles 4, the flow being preferably as rapid and as turbulent as possible so that a large volume of particles is rapidly activated and entrained by the fluid. On the other hand, the quantity and rate of flow are not limitations on the invention, but rather are preferably large to increase the effectiveness of the system. When the solids begin to flow, bypass valve 14 is closed so that maximum flow passes through the system. After the solids are removed, by-pass valve 14 is opened and inlet valve 12 is closed. Outlet valve 13 is closed and bell valve 2 is opened to introduce more solids, and the operation described above is repeated.

The arrangement of inlet and outlet conduits 7 and 9 of FIGURE 1 prevents the bridging of solid particles 4 over outlet conduit terminal 16 or at locations above this point. If a bridge of solid particles tries to form near the outlet conduit terminal 16, as is shown in phantom by numeral 17, the rapid upward flow of fluid exiting from the terminal 19 of inlet conduit 7 will disintegrate it. Whereas prior art devices have had the inlet and the outlet separated so that the fluid pressure would tend to compact the solids in the outlet vicinity, the present invention exerts the inlet fluid pressure and high velocity directly against any bridges that form. In this embodiment the inlet velocity and pressure are exerted underneath such incipient bridges, lifting them away from outlet terminal 16. Furthermore, the coaxial alignment of conduits 7 and 9 produces additional turbulence due to the opposed inlet and outlet fluids flow. Consequently, a bridge tending to form at a higher location in the hopper, as shown in phantom by numeral 18, will be disintegrated by the upward, turbulent flow of fluid. The space 36 between conduits 7 and 9 at conduit terminal 19 as shown in FIGURE 1 is preferably restricted with respect to the remainder of the space 37 between the conduits so that maximum velocity and turbulence are attained. For this reason space 37 should be large enough so that most of the pressure drop in the system occurs at conduit terminal 19, causing jetting of the fluid at this point.

Thus the effect of the invention is the provision of a bulk transport loading apparatus having little tendency to bridge or plug. Another advantage is the elimination of moving parts and, as a consequence, a reduction in maintenance. Moreover, the multidirectional flow promotes even distribution of the solid particles, thereby eliminating pressure surges caused by clogging. The invention permits the use of any geometric form of conduits and hopper and almost any fluid-solid combination.

It should be understood that the invention is not limited to the preferred embodiment illustrated in FIGURE 1. For example, alterations in the locations of the outlet conduit terminal 16 and the terminal 19 of the inlet conduit 7 may be made without departing from the inventive concept. The FIGURE 1 embodiment is preferred because the maximum flow rate is directed toward the outlet conduit terminal 16 where bridges is likely to form. The distance separating terminals 16 and 19 are preferably small so that the flow will not diffuse too widely before reaching terminal 16. Yet outlet conduit terminal 16 may be far removed from the inlet conduit terminal 19 if the fluid entering the hopper reaches terminal 16 with enough force and velocity to disintegrate bridges which tend to form thereon.

Figure 4:
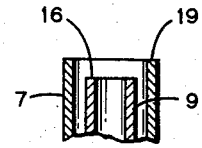
FIGURE 4 is another fragmentary elevational view in section illustrating another disposition of the conduits terminals.
Figure 3:
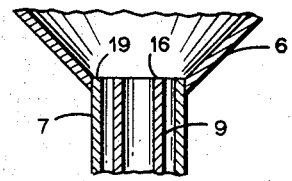
FIGURE 3 is a fragmentary elevational view in section showing an alternate disposition of the conduit terminals.

FIGURE 3 illustrates the termination of the conduits on the same horizontal plane and at the lowest extremity of the hopper. This arrangement is beneficial in eliminating areas underneath terminal 19 where turbulence is missing. In the FIGURE 1 embodiment there are sometimes a few solid particles left in the hopper which are difficult to remove, but the FIGURE 3 arrangement remedies this. FIGURE 4 illustrates an alteration having the outlet conduit terminal 16 below inlet conduit terminal 19. This alteration cannot be carried too far or else the fluid will flow directly from conduit 7 to conduit 9 without reaching the hopper.

Although the fluid flow is represented as being toward the hopper in the outside conduit 7 of FIGURE 1 and away from the hopper in the inside conduit 9, it is apparent that the flow may be reversed in the figures and other embodiments. The cross sectional area of the outlet conduit should be greater than that of the inlet conduit to accommodate the increased volume resulting from the entrainment of solid particles. For this reason, the outlet conduits of the accompanying drawing are illustrated as being larger in cross section than are the inlet conduits. Upon reversing the flow, this area differential should be considered and a decrease in effectiveness expected unless the conduits sizes are altered.

Figure 5:
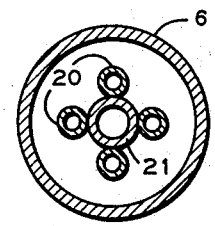
FIGURE 5 is a sectional plan view similar to FIGURE 2 showing an embodiment alternate from that of FIGURE 2 wherein the fluid inlet comprises a plurality of conduits surrounding the outlet conduit.
Figure 6:
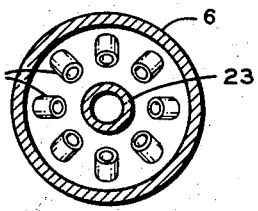
FIGURE 6 illustrates another embodiment which utilizes a plurality of jetting inlet conduits angularly disposed with respect to the outlet conduit longitudinal axis.
Figure 2:
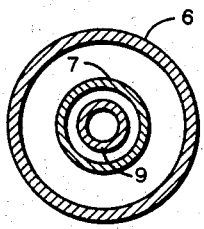
FIGURE 2 is a plan view in section taken as indicated by the lines and arrows 2—2 of FIGURE 1.
Figure 7:
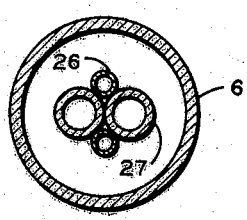
FIGURE 7 shows another embodiment of the invention having two inlet and two outlet conduits.
Figure 8:
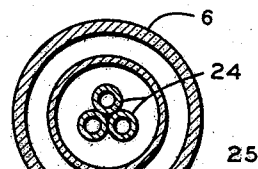
FIGURE 8 illustrates an embodiment having a plurality of inlet jetting conduits placed inside the outlet conduit.
Figure 9:
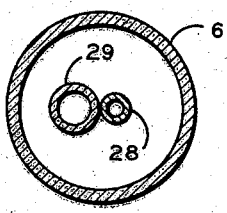
FIGURE 9 shows one inlet conduit and an adjacent outlet conduit.
Figure 10:
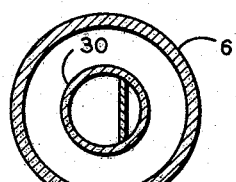
FIGURE 10 illustrates an inlet and an outlet conduit formed by partitioning a tubular member.

Also, the exact number and form of conduits can be varied because the invention is not limited to the concentric tubular arrangement shown in FIGURES 1 through 4. FIGURE 5 illustrates a plurality of inlet conduits 20 surrounding an outlet conduit 21. FIGURE 6 illustrates an extension of this feature wherein a plurality of angularly disposed inlet jets 22 are adjacent to and surround outlet conduit 23. A variation of this theme is shown in FIGURE 8 where the inlet jets 24 are disposed inside the outlet conduit 25. FIGURE 7 shows two inlet conduits 26 and two outlet conduits 27. FIGURE 9 illustrates one inlet conduit 28 and one outlet conduit 29, and FIGURE 10 represents a similar device in which the conduits are formed by partitioning a single conduit 30.

Figure 11:
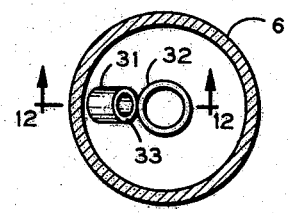
FIGURE 11 is a plan view illustrating an inlet conduit discharging adjacent and across the outlet conduit.
Figure 12:
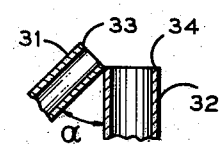
FIGURE 12 is a sectional view of the FIGURE 11 embodiment taken in the direction of the arrows 12—12.

FIGURES 11 and 12 illustrate an inlet conduit 31 angularly disposed with respect to the outlet conduit 32 with its terminal 33 discharging fluid adjacent and across the outlet conduit terminal 34. This disposition of conduits will disintegrate bridges forming near terminal 34 due to the fluid flow being directed across it, and because the nonparallel inlet and outlet fluid flow resulting from the angular disposition of conduits promotes turbulent flow of the fluid within the hopper. In most of the foregoing illustrations the conduits are aligned parallel and consequently, the inlet and outlet flow directions are diametrically opposed, a feature promoting turbulence. It is unnecessary, however, that the conduits be parallel, because turbulence occurs when the angle *a* of FIGURE 12, for example, is within a range varying from zero degrees to substantially less than 180 degrees. Obviously, if the conduits are disposed at 180 degrees with opposed terminals, the inlet fluid can flow directly into the outlet conduit with no diffusion of turbulence throughout the hopper. Consequently, it is preferable to mount the conduits at some other angle. The exact angle at which turbulence is lost as a straight angle is approached depends on the fluid flow rate, the fluid velocity, the hopper geometry and size, the conduits sizes and the solid particles sizes. Best results are obtained with the conduits mounted at less than 90 degrees so that the inlet fluid is directed underneath bridges which tend to form near the outlet. For this reason the concentric conduit alignment is preferred, but the other arrangements shown are within the inventive concept.

As in the other embodiments, it is preferable in the FIGURE 12 embodiment to have inlet terminal 33 at the edge of or underneath terminal 34 so that incoming fluid is discharged directly on the outlet terminus 34 to disintegrate bridges forming thereon. The terminals may be adjacent, however, and need not be in contact with each other, their exact location depending on the velocity of the material being discharged from the outlet. Clearly, if large velocities are available, the terminals may be widely separated and the high velocity inlet fluid flow will reach the outlet and remove bridges at that point. Therefore, the proximity of the terminals is a function of variables and is described as "adjacent" due to the unavailability of more accurate terms.

Figure 13:
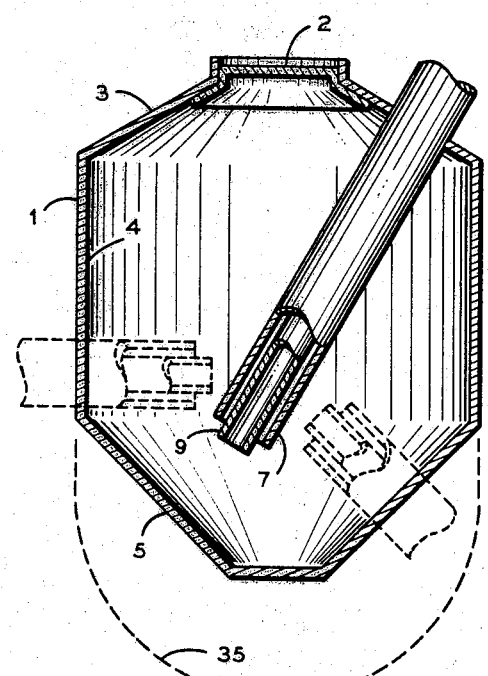
FIGURE 13 illustrates an alternate location of the concentric inlet and outlet conduits of FIGURE 1 with other locations shown in phantom, and an alternate hopper configuration.

FIGURE 13 illustrates that the coaxially aligned conduits 7 and 9 of FIGURE 1 may be positioned other than vertically with respect to the hopper. Best results are obtained, however, with the FIGURE 1 embodiment, especially when heavy particles are used, because gravitational forces aid in moving the particles toward the outlet when it is positioned vertically and at the lower extremity of the hopper. Also illustrated is an alternate hopper configuration 35, it being understood that the invention may be used with any sealable hopper or any other chamber which can be sealed.

The particle size which can be used with the invention is controlled by the size of the outlet conduit. Clearly, solids having a size approaching that of the outlet space available have a greater tendency to bridge. The particle size is also limited by the quantity and flow rate of the fluid. It is advisable to pump as much fluid as possible to the hopper since this increases the turbulence and the effectiveness of the system. The invention has been successfully operated using solid particles of coal, and water as the fluid. Also, sand has been used as the solid particles and air as the fluid, indicating the wide range of applicability of the invention.

When continuous operation is desired, an arrangement of two or more hoppers having automatic valve mechanisms may be utilized so that when one hopper is being drained, another is being filled. This technique is well known in the art, however, and is mentioned merely to indicate the versatility of the invention.

What is claimed is:
1. In a sealable chamber for loading solids into a fluidized bulk transport system, the improvement comprising:
   (A) a fluid inlet conduit having a terminal in communication with the chamber, and
   (B) an outlet conduit for fluidized solids mounted coaxially with and inside the inlet conduit for parallel and opposed flows of the fluids carried therethrough, and also having a terminal in communication with said chamber, said outlet terminal being located adjacent and substantially coplanar with said inlet terminal, said terminals facing upwardly and the terminal lengths of said conduits extending downwardly from said terminals through the bottom of the chamber,
   (C) said inlet and outlet conduits being respectively adapted for connection to means for admitting a flow of fluid to said chamber and means for asporting therefrom a flow of said fluid together with solids removed from said chamber, the said dispositions of said conduits relative to said chamber and to each other being the sole means preventing the formation of flow-impeding bridges of solids adjacent the terminal of said outlet conduit and thereby increasing the rate at which such solids may be removed from the chamber by said fluid flow.

2. In a sealable chamber for entraining coal, gravel, sand and other broken ore solids in a fluid, the improvement comprising:
   (A) an outlet conduit for fluid-entrained solids which terminates inside the hopper, and
   (B) a fluids inlet conduit substantially coaxially aligned and surrounding the outlet conduit with its terminal adjacent that of the outlet conduit, said terminals facing generally upwardly and said conduits extending downwardly from their terminals through the bottom end of the chamber,
   (C) said inlet and outlet conduits being respectively adapted for connection to means for admitting a flow of fluid to said chamber and means for asporting therefrom a flow of said fluid together with solids removed from said chamber, the said dispositions of said conduits relative to said chamber and to each other thus providing for parallel and opposed flows of the fluids carried therethrough and also being the sole means preventing the formation of flow-impeding bridges of solids on and adjacent the terminal of said outlet conduit and thereby increasing the rate at which such solids may be removed from the chamber by said fluid flow.

References Cited
UNITED STATES PATENTS

| | | | |
|---|---|---|---|
| 528,418 | 10/1894 | Duckham | 302—53 |
| 2,924,489 | 2/1960 | Beckmann | 302—29 |
| 3,001,829 | 9/1961 | De Saint-Martin | 302—53 |
| 3,029,000 | 4/1962 | Kobee | 302—53 |

ANDRES H. NEILSEN, *Primary Examiner.*

SAMUEL F. COLEMAN, *Examiner.*

A. LEVINE, *Assistant Examiner.*